(12) United States Patent
Wang (10) Patent No.: US 12,402,641 B2
(45) Date of Patent: Sep. 2, 2025

(54) SMOKING DEVICE

(71) Applicant: Jiahao Wang, Jiande (CN)

(72) Inventor: Jiahao Wang, Jiande (CN)

( * ) Notice: Subject to any disclaimer, the term of this patent is extended or adjusted under 35 U.S.C. 154(b) by 0 days.

(21) Appl. No.: 19/190,796

(22) Filed: Apr. 28, 2025

(65) Prior Publication Data

US 2025/0255320 A1 Aug. 14, 2025

(51) Int. Cl.
*A23B 4/052* (2006.01)
*C12G 3/07* (2006.01)

(52) U.S. Cl.
CPC ............... *A23B 4/052* (2013.01); *C12G 3/07* (2019.02)

(58) Field of Classification Search
CPC .................................. A23B 4/052; C12G 3/07
USPC ............................................................ 99/467
See application file for complete search history.

(56) References Cited

U.S. PATENT DOCUMENTS

| | | | | |
|---|---|---|---|---|
| 8,651,018 B1* | 2/2014 | Loud, III | ............ | A47J 37/0704 |
| | | | | 99/481 |
| 12,096,779 B1* | 9/2024 | Li | ........................ | A23B 4/0523 |
| 12,324,440 B1* | 6/2025 | Zheng | ..................... | F23Q 3/006 |
| 2016/0183722 A1* | 6/2016 | Fisher | ................. | A47J 37/0754 |
| | | | | 99/425 |
| 2018/0325314 A1* | 11/2018 | Walters | ............... | A47J 37/0713 |
| 2019/0045834 A1* | 2/2019 | Fuisz | ..................... | A24B 15/24 |
| 2020/0221718 A1* | 7/2020 | Flood | ........................ | C12G 3/07 |
| 2022/0361543 A1* | 11/2022 | Middleton | .............. | A23L 27/27 |

* cited by examiner

*Primary Examiner* — Jimmy Chou (57) ABSTRACT

The present disclosure relates to a smoking device, comprising a base, a cover, an electronic ignition kit, and a smoke delivery assembly. The base includes a combustion chamber for burning smoker fuels and a feed inlet in communication with the chamber. The detachable cover is connected to the base and is configured to seal the feed inlet. The electronic ignition kit is configured to ignite the smoker fuels, while the smoke delivery assembly is configured to direct the smoke generated from combustion to smoke the food. The smoking device of the present disclosure adopts a systematic design based on four functional modules: "combustion-sealing-ignition-smoke delivery," thereby addressing the drawbacks of conventional smoking devices, such as low efficiency, high risk of contamination, and operational hazards. This design significantly enhances the user experience.

17 Claims, 13 Drawing Sheets

SMOKING DEVICE

TECHNICAL FIELD

The present disclosure relates to the technical field of food processing equipment, and more particularly to a smoking device.

BACKGROUND OF THE INVENTION

With the development of society, while enjoying material well-being, people are increasingly pursuing spiritual satisfaction. As such, more consumers are fond of alcoholic beverages with a smoked flavor due to their unique taste. When preparing such beverages, the host typically uses a smoking device to infuse smoke flavor into drinks or foods.

Currently, a wide variety of smoking devices are available on the market. However, due to the absence of an electronic ignition kit, users must rely on a blowtorch or similar ignition device to light the smoker fuels, thereby producing the smoke necessary for flavoring food and beverages. This open-flame operation poses a safety hazard, as ignition mishandling in enclosed or semi-enclosed environments may result in accidental combustion and even personal injury.

Therefore, the present disclosure provides a smoking device capable of effectively mitigating the aforementioned risks.

SUMMARY OF THE INVENTION

In order to overcome the shortcomings of the prior art, the present disclosure provides a smoking device with a simple structure that eliminates the need for open-flame ignition tools such as blowtorches. It reduces the risk of injury caused by improper ignition operations and improves user experience.

To achieve the above objectives, the technical solution provided by the present disclosure is as follows.

A smoking device, comprising:
- a base, the base being provided with a combustion chamber configured to hold and burn smoker fuels, and a feed inlet in communication with the combustion chamber, wherein the combustion chamber includes a smoke-guiding hole;
- a detachable cover connected to the base and covering the feed inlet;
- an electronic ignition kit configured to ignite the smoker fuels;
- a smoke delivery assembly configured to direct the smoke generated from the combustion of the smoker fuels through the smoke-guiding hole for smoking food.

As an improvement of the present disclosure, the cover comprises an upper cover and a lower cover, which together define an accommodation space. The electronic ignition kit and the smoke delivery assembly are disposed within the accommodation space.

As an improvement of the present disclosure, the lower cover is provided with an ignition opening and an airflow opening. The ignition opening is configured to allow a portion of the electronic ignition kit to pass through, and the airflow opening is configured to permit airflow to guide the flow of smoke.

As an improvement of the present disclosure, the lower cover is further provided with a isolation baffle. The ignition opening is disposed on one side of the isolation baffle, and the airflow opening is disposed on the opposite side thereof, so that the airflow for directing smoke can pass through the airflow opening into the combustion chamber.

As an improvement of the present disclosure, the lower cover is further provided with a mounting enclosure. The isolation baffle is arranged within the mounting enclosure, which defines a first mounting area and a second mounting area. The isolation baffle separates the first mounting area from the second mounting area, wherein the first mounting area is configured to mount the electronic ignition kit, and the second mounting area is configured to mount the smoke delivery assembly.

As an improvement of the present disclosure, the electronic ignition kit comprises an ignition head. The ignition opening is configured to allow the ignition head to pass through. When the cover is connected to the base, the ignition opening is positioned opposite the central portion of the feed inlet.

As an improvement of the present disclosure, the electronic ignition kit further comprises a control circuit board electrically connected to the ignition head. The control circuit board is provided with an ignition switch configured to control the ignition head to generate electric sparks.

As an improvement of the present disclosure, the smoke delivery assembly comprises an air-guiding channel, which is defined by a portion of the isolation baffle and a portion of the mounting enclosure. The airflow opening is located at the bottom of the air-guiding channel and communicates therewith.

As an improvement of the present disclosure, the smoke delivery assembly further comprises a smoke-guiding fan configured to generate airflow for directing smoke. The smoke-guiding fan is a turbine fan.

As an improvement of the present disclosure, the device further comprises a filter screen detachably connected to the base. The filter screen is provided with an inner filter screen matching the combustion chamber, which is inserted into the combustion chamber through the feed inlet. When the cover is closed, the filter screen is positioned between the cover and the base, and the inner filter screen is inserted into the combustion chamber.

As an improvement of the present disclosure, the combustion chamber comprises a combustion zone, a smoke zone, and a smoke-guiding hole. The combustion zone and the smoke zone are separated by the inner filter screen, with the combustion zone located above the inner filter screen and the smoke zone located below it. The smoke-guiding hole is formed on the chamber wall defining the combustion chamber and is in communication with the smoke zone.

As an improvement of the present disclosure, the filter screen comprises a filter ring frame. The upper portion of the base is provided with a filter ring slot and a sealing platform surrounding the filter ring slot. The dimensions of the filter ring slot correspond to those of the filter ring frame. The sealing platform is configured to sealingly engage with the cover to form an enclosed structure on the upper portion of the base.

As an improvement of the present disclosure, the fit between the inner filter screen and the combustion chamber, into which it is inserted via the feed inlet, is preferably an interference fit.

As an improvement of the present disclosure, the device further comprises a heat insulation element detachably connected to the lower cover.

As an improvement of the present disclosure, the heat insulation element comprises a snap-fit plate, and the lower cover comprises a snap-fit hole. The snap-fit plate is detachably connected to the snap-fit hole such that the heat insulation element is removably connected to the lower cover.

As an improvement of the present disclosure, the device further comprises an adapter, which is detachably connected to the base and configured to expand the application scenarios of the smoking device.

As an improvement of the present disclosure, the device further comprises a connecting hose and a smoking hood. The connecting hose is configured to connect the adapter and the smoking hood.

As an improvement of the present disclosure, the device further comprises a dedicated smoking cup.

As an improvement of the present disclosure, the upper cover is provided with an air inlet.

As an improvement of the present disclosure, the device further comprises a built-in power source configured to supply power to the electronic ignition kit and the smoke delivery assembly. The built-in power source is rechargeable.

The beneficial effects of the present disclosure are as follows: With the foregoing configuration, the electronic ignition kit can ignite the smoker fuels with one single press, thereby avoiding the risk of accidental combustion caused by open flames in enclosed or semi-enclosed environments. This achieves flameless and automated ignition, enhancing both operational safety and convenience. The smoke delivery assembly, through its physical design, converts "irregular smoke" into "controlled airflow," thereby enabling efficient utilization and directional delivery of smoke. The smoking device disclosed herein adopts a systematic design based on four major modules—combustion, sealing, ignition, and smoke guidance—which effectively addresses common drawbacks of traditional smoking devices, such as low efficiency, environmental contamination, and safety hazards during operation. Consequently, the user experience is significantly improved.

BRIEF DESCRIPTION OF DRAWINGS

To more clearly illustrate the technical solutions of the embodiments of the present disclosure, a brief introduction to the drawings required for the embodiment description is provided below. The drawings depicted here are merely for the sake of illustrating some of the embodiments of the present disclosure. Those skilled in the art will understand that, without any inventive effort, other drawings may be derived from these diagrams. Furthermore, the drawings are not drawn to scale, and the relative dimensions of the components in the diagrams are shown by way of example, not necessarily according to actual proportions.

The present disclosure is further described below in detail in combination with the accompanying drawings and embodiments.

Reference numerals: 100, base; 200, cover; 300, electronic ignition kit; 400, smoke delivery assembly; 500, filter; 600, heat insulation component; 700, conversion connector; 800, connection hose; 900, smoking hood; 1000, dedicated smoking cup; 1100, built-in power supply; 110, combustion chamber; 111, combustion area; 112, smoke area; 113, smoke-guiding hole; 120, feed inlet; 130, filter ring groove; 140, sealing platform; 210, upper cover; 211, air inlet; 220, lower cover; 221, ignition opening; 222, airflow opening; 223, isolation baffle; 224, mounting enclosure; 225, first mounting area; 226, second mounting area; 227, snap-in hole; 230, accommodation space; 310, ignition head; 320, control circuit board; 321, ignition switch; 410, airflow channel; 420, smoke-guiding fan; 510, inner filter; 520, filter ring frame; 610, snap-in plate.

DETAILED DESCRIPTION OF THE INVENTION

To make the aforementioned objectives, features, and advantages of the present disclosure more comprehensible, specific implementations of the present disclosure are described in detail below in conjunction with the accompanying drawings. In the following description, numerous specific details are set forth to provide a thorough understanding of the present disclosure. The present disclosure may, however, be embodied in many forms different from that described here. A person skilled in the art can make similar improvements without departing from the connotation of the present disclosure. Therefore, the present disclosure is not limited by the specific embodiments disclosed below.

In the description of the present disclosure, it should be understood that terms such as "center." "longitudinal," "lateral," "length." "width." "thickness," "up." "down," "front," "rear." "left," "right," "vertical," "horizontal," "top," "bottom," "inside," "outside," "clockwise," "counterclockwise," "axial," "radial," "circumferential," and others refer to the orientation or positional relationships based on the orientations or positional relationships shown in the accompanying drawings, which are provided for convenience in describing this application and simplifying the description. These terms do not indicate or imply that the device or component must have a specific orientation or must be constructed and operated in a specific orientation. Therefore, these terms should not be understood as limitations of this disclosure.

In addition, the terms "first" and "second" are used for descriptive purposes only, while not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

In the description of the present disclosure, it is to be noted that unless otherwise expressly specified and defined, the terms "mounted", "connected", and "connected" are to be construed broadly, for example, as either a fixed connection, or a detachable connection, or an integral connection, either a mechanical connection, or an electrical connection. The specific meaning of the above term in the present disclosure will be understood by those of ordinary skill in the art depending on the particular circumstances, either directly or indirectly via an intermediate medium, communication between the two elements, or interaction between the two elements. The specific meanings of these terms in the present disclosure will be understood by those of ordinary skill in the art as the case may be.

In the present disclosure, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right above and obliquely above the second feature, or merely indicates that the horizontal height of the first feature is less than the second feature.

It should be noted that when an element is referred to as being "fixed to" another element, the element can be directly on another component or there can be a centered element. When an element is considered to be "connected" to another element, the element can be directly connected to another element or there may be a centered element. The terms "vertical", "horizontal", "up", "down", "left", "right", and similar expressions used herein are for illustrative purposes only and do not necessarily represent the only implementation.

Referring to FIG. 1 to FIG. 13, a smoking device includes:

A base 100, which is provided with a combustion chamber 110 for holding smoker fuels, and a feed inlet 120 that communicates with the combustion chamber 110, wherein the combustion chamber 110 includes a smoke-guiding hole 113 that communicates with the chamber.

A cover 200, which is detachably connected to the base 100 and covers the feed inlet 120.

An electronic ignition kit 300, used to ignite the smoker fuels.

A smoke delivery assembly 400, which directs the smoke generated from the burning material through the smoke-guiding hole 113 to smoke food.

With the described structure, during use, the electronic ignition kit 300 allows for one-touch ignition of the smoker fuels, avoiding the danger of accidental fires from open flames in closed or semi-closed environments. This results in no open flame and automated ignition, improving operational safety and convenience. The smoke delivery assembly 400, through its physical structure design, transforms "irregular smoke" into "controllable smoke flow," enabling efficient use and directional delivery of the smoke. The smoke-infusing device of the present invention, through a systematic design of the "combustion-seal-ignition-smoke guiding" modules, addresses the inefficiencies, pollution, and operational risks of traditional smoking devices, further enhancing the user experience. In this embodiment, the electronic ignition kit 300 uses a pulsed ignition technology. However, the use of an electric heating wire (which generates heat to ignite the smoker fuels) or infrared heating technology as a replacement for the pulsed ignition technology is also considered within the scope of this invention.

In this embodiment, the cover body 200 includes an upper cover 210 and a lower cover 220, which together define an accommodating space 230. The electronic ignition kit 300 and the smoke delivery assembly 400 are arranged within the accommodating space 230. With this arrangement, during use, the accommodating space 230 provides a relatively enclosed environment for the electronic ignition kit 300 and the smoke delivery assembly 400, preventing external dust, moisture, and debris from entering, thereby avoiding contamination, corrosion, or damage to these components, ensuring their performance and service life. Meanwhile, the electronic ignition kit 300 and the smoke delivery assembly 400 being concentrated in the accommodating space 230 helps achieve integration and miniaturization of the product, making the entire device structure more compact and convenient for installation, use, and portability.

In this embodiment, the lower cover 220 is equipped with an ignition opening 221 and a airflow opening 222. The ignition opening 221 allows part of the electronic ignition kit 300 to pass through, while the airflow opening 222 provides a path for airflow that guides the smoke. With this arrangement, during use, the ignition opening 221 provides a physical passage for part of the electronic ignition kit 300, enabling its front end to extend into the designated ignition area. This design ensures that the electronic ignition kit 300 maintains a proper distance from the smoker fuels, preventing ignition failure or unnecessary energy loss due to positional deviations. The core function of the airflow opening 222 is to provide a path for internal or external airflow, guiding the air to flow in a predetermined direction, thereby driving the generation and transmission of smoke.

In this embodiment, the lower cover 220 is further equipped with an isolation baffle 223. The ignition opening 221 is positioned on one side of the isolation baffle 223, while the airflow opening 222 is located on the opposite side of the baffle, allowing the airflow guiding the smoke to enter the combustion chamber 110 through the airflow opening 222. With this arrangement, during use, the isolation baffle 223 divides the inside of the lower cover 220 into two independent areas: the "ignition side," where the ignition opening 221 is located, and the "ventilation side," where the airflow opening 222 is located. This partition forces external airflow to enter the combustion chamber 110 only through the airflow opening 222, rather than leaking directly through the ignition opening 221, thus preventing the ignition heat from being carried away by the air flowing through the ignition opening 221, which could affect the ignition effect.

In this embodiment, the lower cover 220 is also equipped with a mounting surround 224. The isolation baffle 223 is positioned within the mounting surround 224, which contains a first mounting area 225 and a second mounting area 226. The isolation baffle 223 separates the first mounting area 225 from the second mounting area 226. The first mounting area 225 is used to mount the electronic ignition kit 300, while the second mounting area 226 is used to mount the smoke delivery assembly 400. With this arrangement, during use, the partitioned structure formed by the mounting surround 224 and the isolation baffle 223 enables independent installation and collaborative operation of different functional components through modular spatial design. This resolves potential conflicts between the electronic ignition kit 300 and the smoke delivery assembly 400 in terms of layout, function, and physical properties, enhancing the reliability of the device. Moreover, the modular approach increases flexibility in production, maintenance, and upgrades, making it suitable for smoke-infusing devices that require high component synergy and environmental adaptability.

In this embodiment, the electronic ignition kit 300 includes an ignition head 310, and the ignition opening 221 allows the ignition head 310 to pass through. When the cover body 200 is connected to the base 100, the ignition opening 221 is positioned relative to the middle of the feed inlet 120. With this arrangement, during use, the middle position of the feed inlet 120 is typically the center of the accumulated smoker fuels to be combusted. By aligning the ignition head 310 with this position. "core ignition" can be achieved, where the flame or heat spreads from the center of the material outward. This prevents local overheating or incomplete combustion due to edge ignition, improves combustion efficiency and smoke generation quality, and ensures even combustion, reducing the generation of harmful substances (such as carbon monoxide and tar). This is especially important in scenarios where the combustion temperature needs to be controlled, as central positioning can more accurately control the heat conduction path.

In this embodiment, the electronic ignition kit 300 further includes a control circuit board 320, which is electrically connected to the ignition head 310. The control circuit board 320 is equipped with an ignition switch 321, which controls the generation of electrical sparks by the ignition head 310. With this arrangement, the control circuit board 320 and the ignition switch 321 of the electronic ignition kit 300 enable precise control and reliable operation of the ignition function through circuit control, human-machine interaction, safety protection, and structural integration.

In this embodiment, the smoke delivery assembly 400 includes a wind guide channel 410, which is partially defined by the isolation baffle 223 and the mounting surround 224. The airflow opening 222 is located at the bottom of the wind guide channel 410. During use, the isolation baffle 223, which was previously used to separate the first mounting area 225 (for the electronic ignition kit 300) and the second mounting area 226 (for the smoke delivery assembly 400), further serves as part of the wind guide channel 410. This enables both spatial isolation and functional separation. The electronic ignition kit 300 (mainly the ignition head 310) needs to avoid direct contact with the airflow guiding the smoke. The isolation baffle 223 prevents the airflow in the wind guide channel 410 from entering the ignition opening 221 in the first mounting area 225, thereby avoiding the loss of heat from the ignition head 310, which could affect the ignition effect. The wind guide channel 410, formed by the isolation baffle 223 and the mounting surround 224, ensures independent airflow paths and enhances safety. This design minimizes the need for additional components, simplifying the structural design and saving space. This "functional reuse" design approach integrates multi-component installation and airflow control within the limited space of the lower cover 220, improving the device's compactness and reliability.

In this embodiment, the smoke delivery assembly 400 also includes a smoke fan 420, which generates the airflow needed to guide the smoke. The smoke fan 420 is a turbine fan. During use, the smoke fan 420 is driven by a motor to rotate the blades, actively generating stable and directional airflow (as opposed to relying on passive convection driven by natural wind pressure or temperature differences). This ensures that the smoke or air flows efficiently through the preset path—from the airflow opening 222 into the combustion chamber 110 and ultimately to the food or beverage to be smoked. This is especially useful in scenarios where natural ventilation is insufficient (e.g., enclosed or semi-enclosed equipment), preventing problems such as smoke stagnation and incomplete combustion due to turbulent airflow. Compared to regular axial flow fans, turbine fans offer concentrated airflow, higher wind pressure, and lower noise, further enhancing the user's experience.

This embodiment also includes a removable filter screen 500, which is connected to the base 100. The filter screen 500 has an inner filter screen 510 that matches the combustion chamber 110 and is inserted into the combustion chamber 110 via the feed inlet 120. When the cover body 200 is closed, the filter screen 500 is positioned between the cover body 200 and the base 100, with the inner filter screen 510 inserted into the combustion chamber 110. During use, the user can select a suitable beverage or food (e.g., cocktail, whiskey, etc.) and place it in a suitable container (e.g., a glass). The user can also select the appropriate smoker fuels (e.g., pine wood chips) and place it in the inner filter screen 510. The inner filter screen 510, containing the smoker fuels, is then inserted into the combustion chamber 110. The base 100, along with the inner filter screen 510 filled with smoker fuels, is placed on top of the container holding the food or beverage. The electronic ignition kit 300 is used to ignite the smoker fuels, causing it to produce smoke. The smoke then passes through the filter screen 500 into the smoke chamber 112 and finally enters the container, imparting a smoky flavor to the beverage or food.

In this embodiment, the combustion chamber 110 comprises a combustion zone 111, a smoke zone 112, and a smoke guide hole 113. The combustion zone 111 and the smoke zone 112 are separated by the inner mesh filter 510. The combustion zone 111 is positioned above the inner mesh filter 510, while the smoke zone 112 is located below it. The smoke guide hole 113 is formed on the chamber wall that defines the combustion chamber 110 and communicates with the smoke zone 112. With this configuration, during operation, smoker fuels combust in the combustion zone 111 and generate smoke. Before entering the smoke zone 112, the smoke passes through the inner mesh filter 510 for further purification, thereby improving the quality of the smoke used for smoking. Once the smoke accumulates to a certain extent in the smoke zone 112. it is discharged via the smoke guide hole 113 located on the chamber wall of the smoke zone 112. The inner mesh filter 510 helps filter out most solid impurities in the smoke, making it cleaner. It should be understood by those skilled in the art that, without inventive effort, the smoke quality may also be controlled by increasing or decreasing the number of filter layers.

In this embodiment, the filter assembly 500 includes a filter ring frame 520. The upper portion of the base 100 is provided with a filter ring slot 130 and a sealing platform 140 surrounding the slot 130. The size of the filter ring slot 130 corresponds to that of the filter ring frame 520. The sealing platform 140 forms a closed structure when engaged with the cover body 200. With this arrangement, during installation, the filter ring frame 520 aligns precisely with the filter ring slot 130 on the base 100 to form a mechanically matched fit. This ensures accurate positioning of the filter assembly 500, preventing shaking or misalignment caused by installation errors. It also provides stable support for the inner mesh filter 510, ensuring its structural integrity under high temperatures and particle impact during combustion. The sealing platform 140, which surrounds the filter ring slot 130, contacts the cover body 200 when the cover is closed, thereby sealing the upper portion of the base 100 (i.e., including the combustion chamber 110) from the external environment. This prevents leakage of smoke, heat, or sparks generated during combustion from the joint between the base 100 and the cover body 200, enhancing safety and ensuring the internal airflow—generated by the smoke guiding fan 420—follows the intended path. It also prevents disruption caused by unregulated external air inflow.

In this embodiment, the fit between the inner mesh filter 510 and the combustion chamber 110—accessed through the feed inlet 120—is preferably a clearance fit. This design reduces the wear of the inner mesh filter 510 and extends its service life. It is further contemplated that those skilled in the art, without inventive step, may directly install the inner mesh filter 510 within the combustion chamber 110 to achieve a similar function.

This embodiment also includes a heat insulation element 600 detachably connected to the lower cover 220. The heat insulation element 600 comprises a snap-fit plate 610, while the lower cover 220 includes snap-fit holes 227. The snap-fit plate 610 is removably connected to the snap-fit holes 227, allowing the heat insulation element 600 to be detachably mounted to the lower cover 220. The insulation element 600 is made of high-temperature-resistant material and is positioned near the combustion zone 111 of the combustion chamber 110, effectively preventing heat transfer to the lower cover 220. This avoids deformation or aging of the lower cover 220 caused by prolonged exposure to high temperatures, thereby extending the component's service life. The snap-fit structure enables tool-free assembly and disassembly, allowing quick replacement of the insulation element 600 if damaged or aged due to heat, without the need for dismantling the entire device. It is to be understood that although three snap-fit plates 610 are provided in this embodiment, other suitable quantities may also be used.

Figure 11:
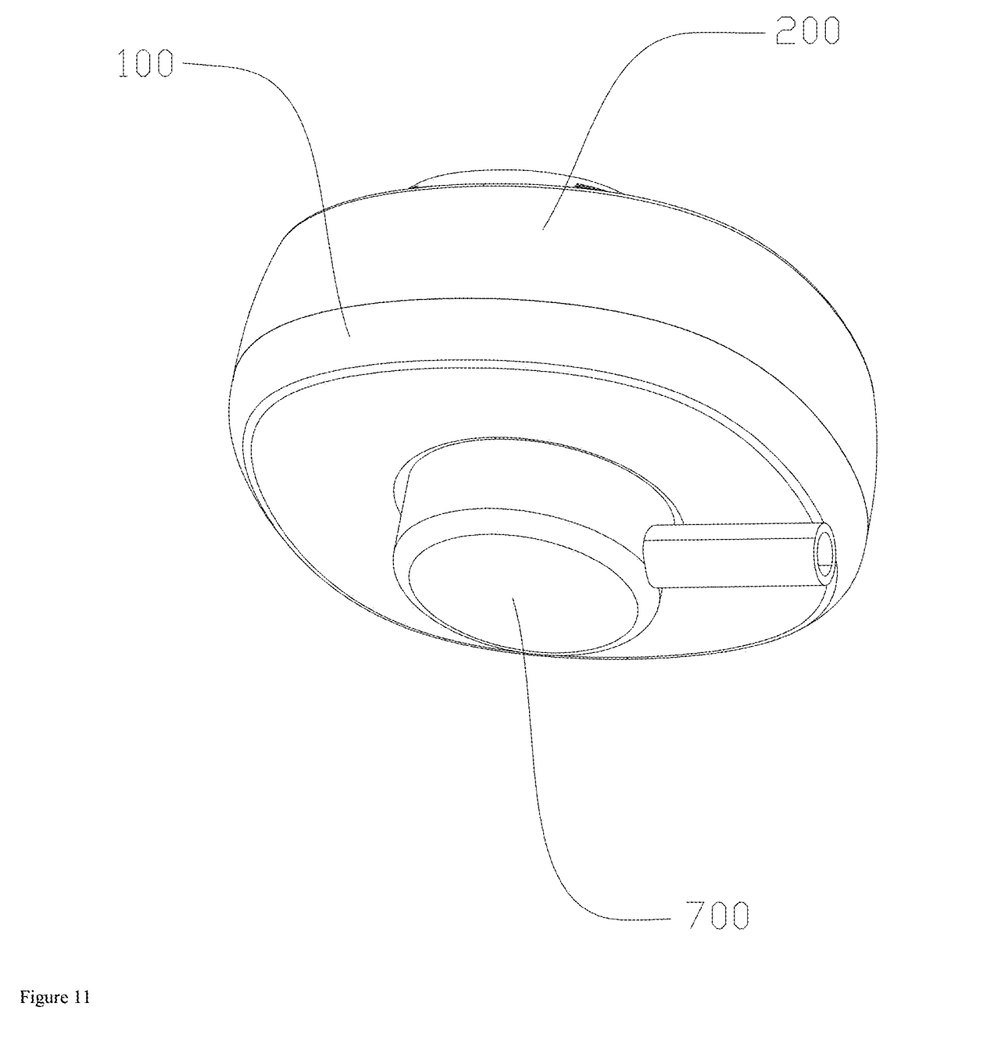
FIG. 11 is a schematic view of the smoking device when an adapter connector is assembled, according to the first embodiment of the present disclosure.
Figure 12:
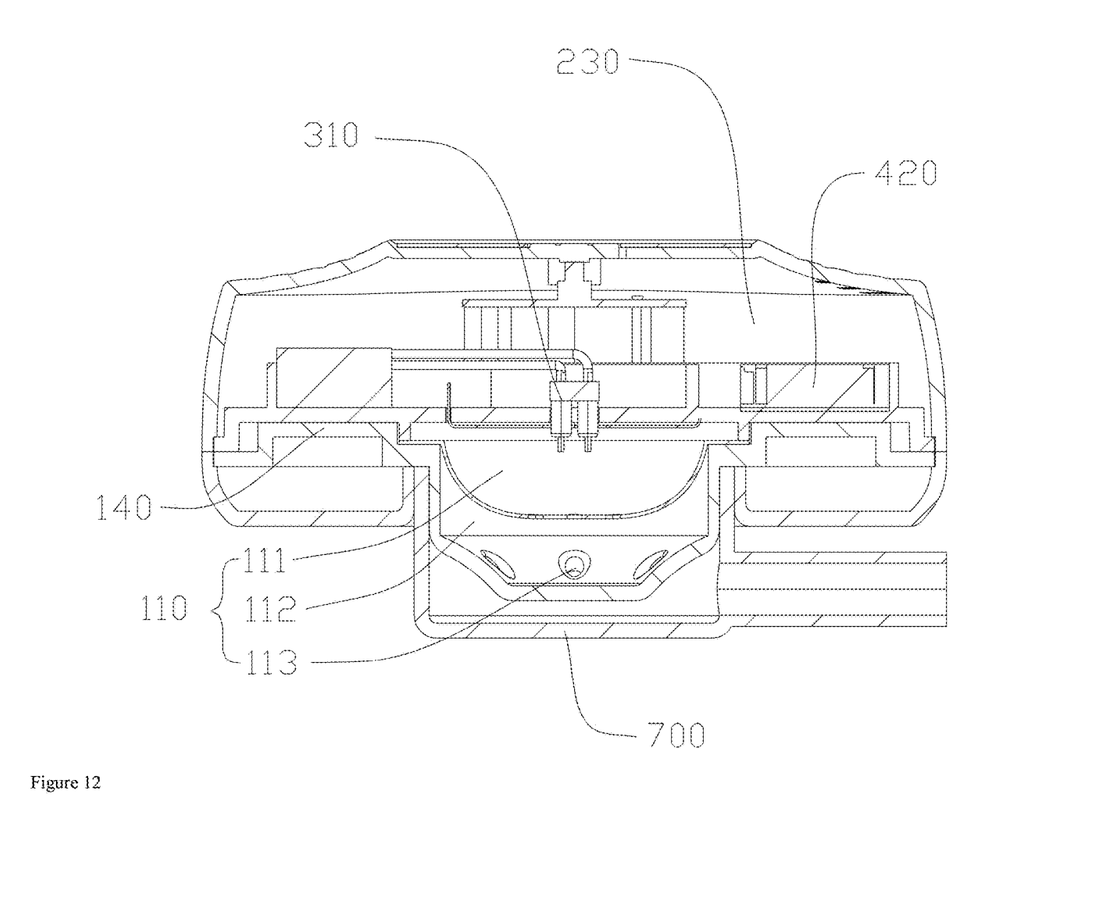
FIG. 12 is a cross-sectional schematic view of the smoking device when the adapter connector is assembled, according to the first embodiment of the present disclosure.

This embodiment further comprises an adapter 700 detachably connected to the base 100, configured to extend the application scenarios of the smoking device. The adapter 700 is detachably mounted on the outer wall of the combustion chamber 110 via a snap-fit mechanism, allowing easy connection to the base 100. The adapter 700, by implementing a modular interface, enables broader application coverage, including household, outdoor, and commercial uses, thereby overcoming the limitations of the device's original structure. When connected to the base 100, smoke is discharged from the outlet of the adapter 700.

Figure 13:
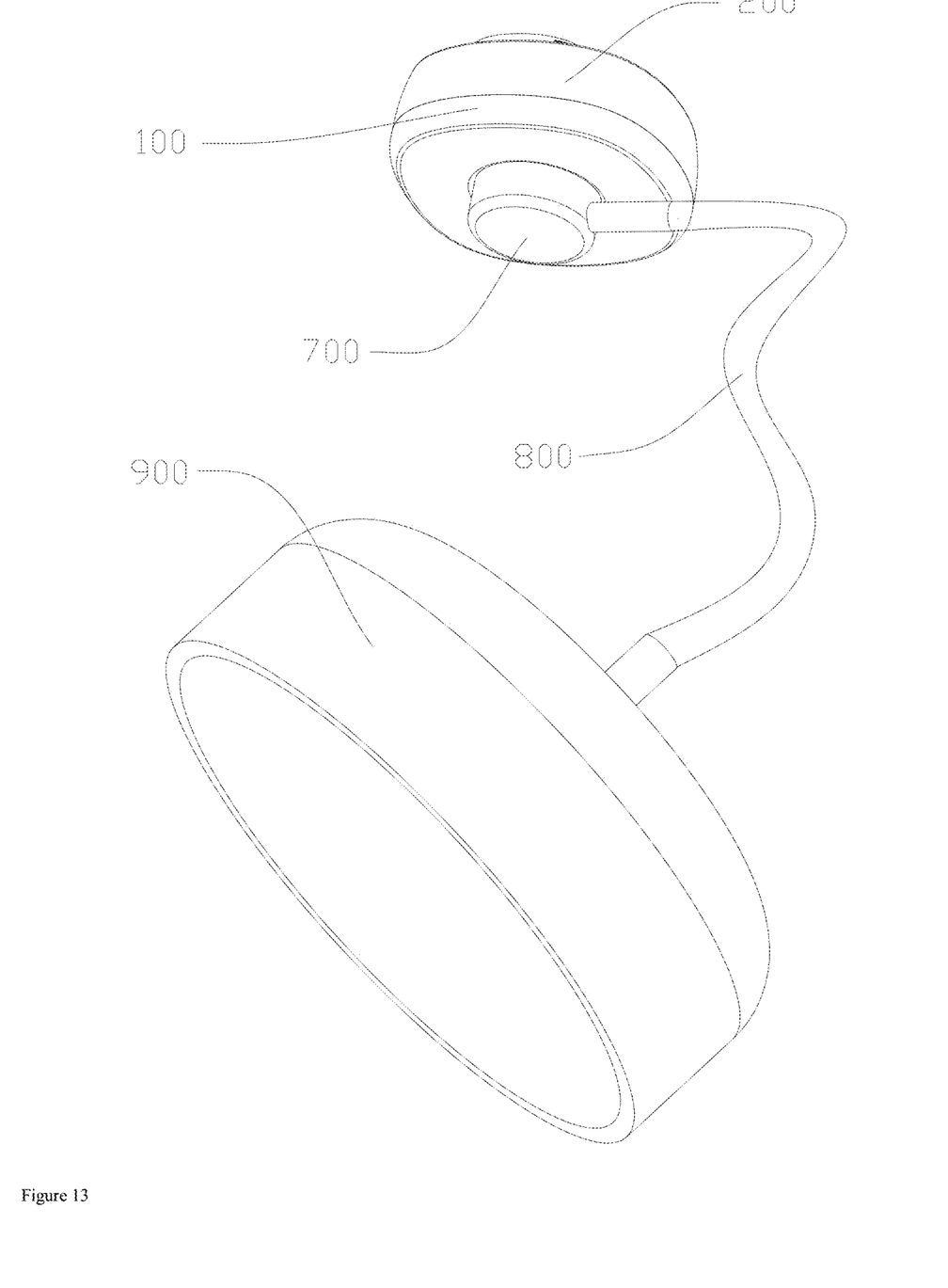
FIG. 13 is a schematic view of the smoking device when the adapter connector, a connection hose, and a smoking hood are assembled, according to the first embodiment of the present disclosure.

In addition, the embodiment comprises a flexible hose 800 and a smoking hood 900. The hose 800 connects the adapter 700 to the smoking hood 900. Together, the hose 800 and smoking hood 900 serve as extended components of the adapter 700, forming a complete "smoke transmission-application terminal" chain. The flexibility of the hose 800 removes spatial constraints of fixed device connections. Once the adapter 700 is connected to the base 100, the hose 800 may be extended to a location distant from the combustion chamber 110 (e.g., placing the smoking hood 900 on a tabletop). Furthermore, its flexibility allows the user to temporarily adjust the smoking hood 900 during operation (e.g., adjusting the hood angle when flipping food) without interrupting smoke flow, thereby improving operational flexibility and enhancing the user experience.

Figure 1:
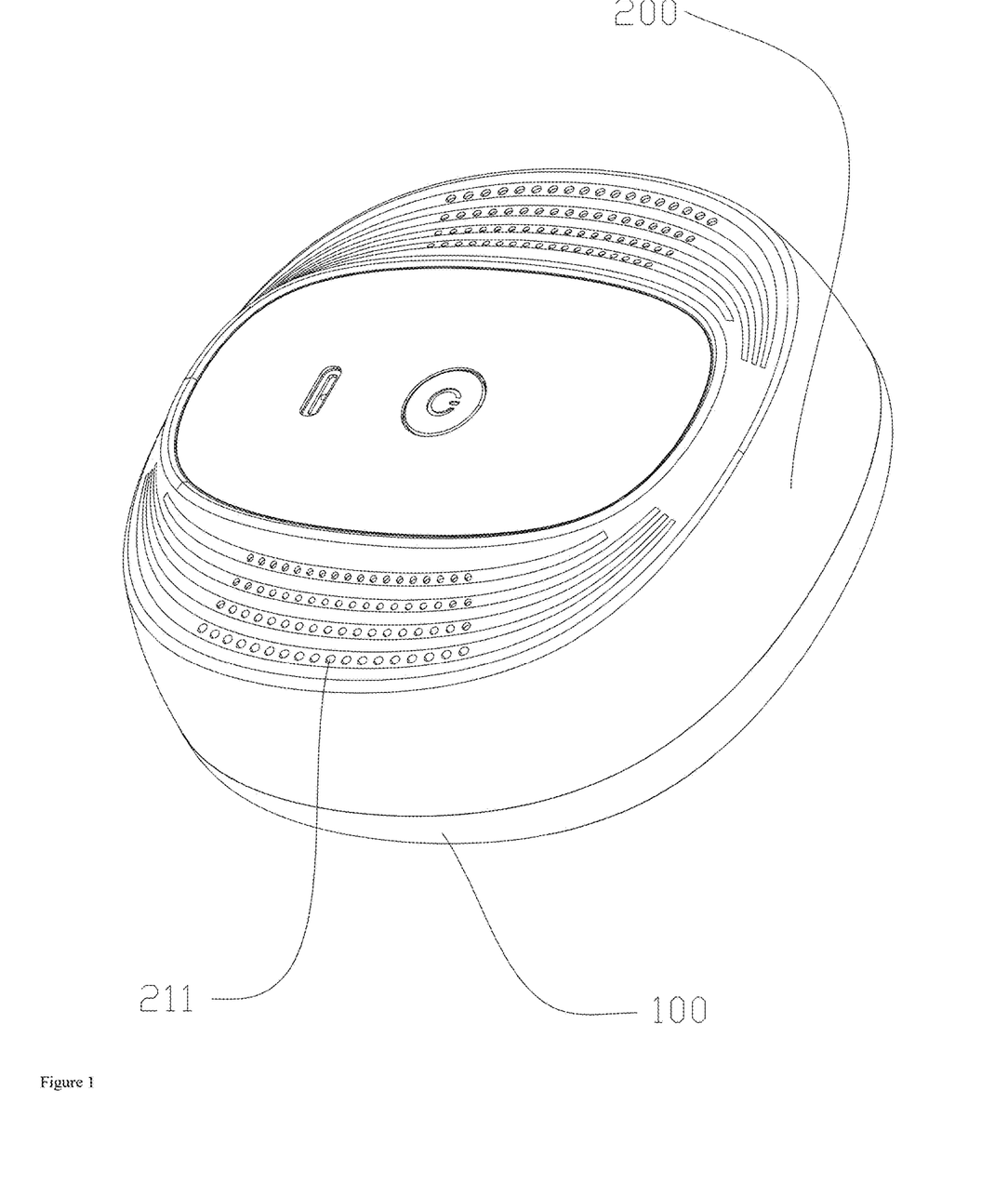
FIG. 1 is a schematic view of the overall structure of the smoking device in a first state from a first angle, according to a first embodiment of the present disclosure.
Figure 2:
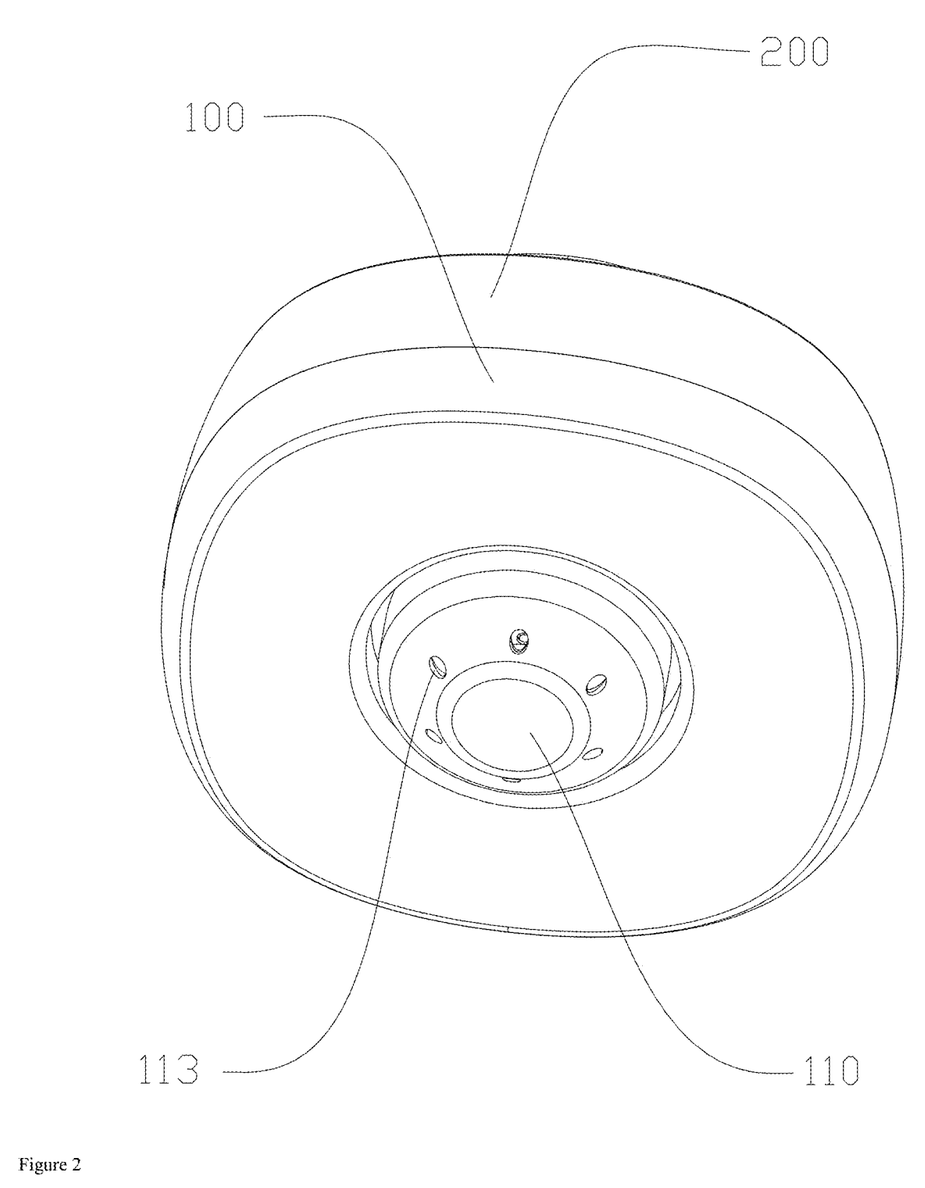
FIG. 2 is a schematic view of the overall structure of the smoking device in a first state from a second angle, according to the first embodiment of the present disclosure.
Figure 3:
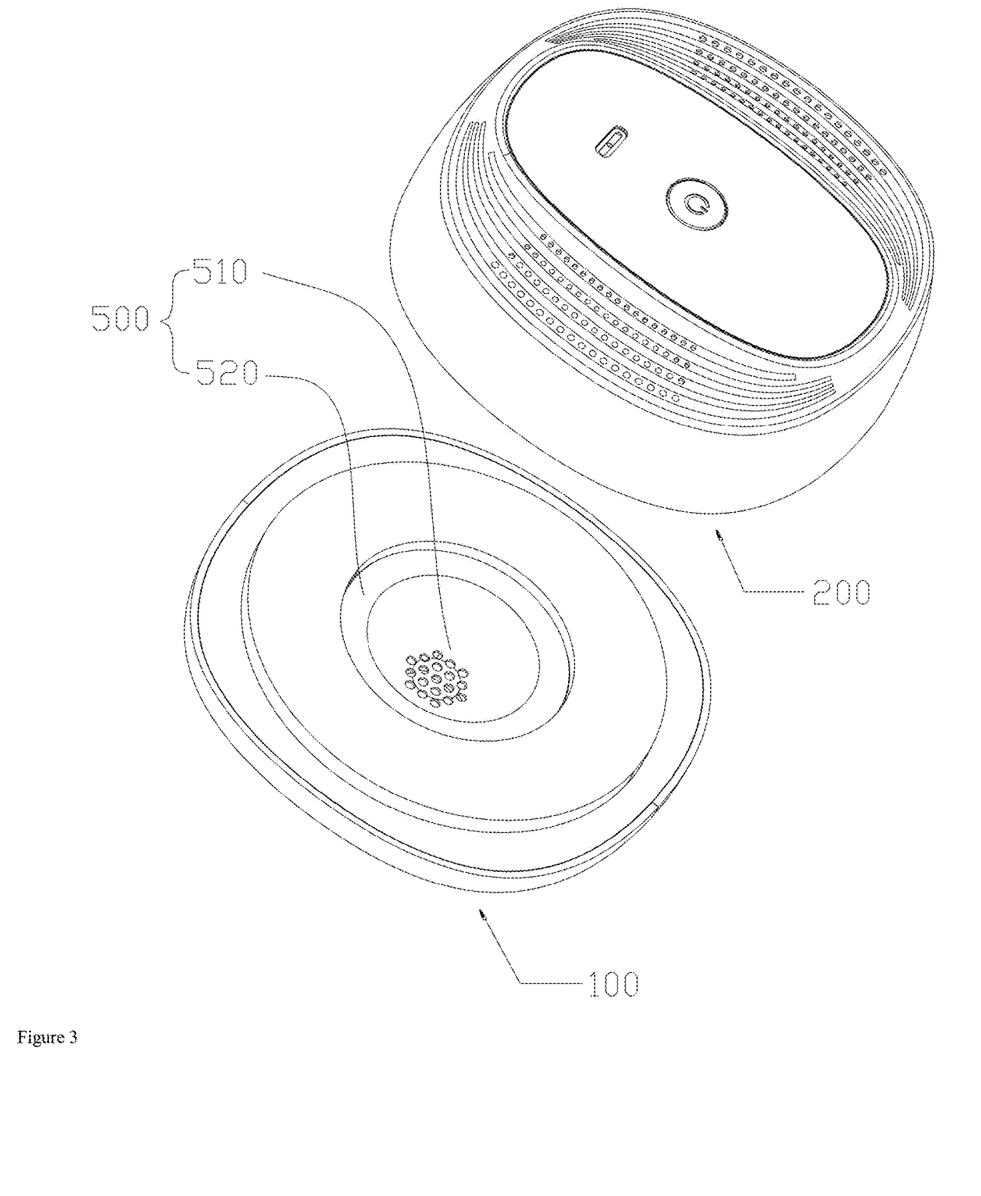
FIG. 3 is a schematic view of the overall structure of the smoking device in a second state from a first angle, according to the first embodiment of the present disclosure.
Figure 4:
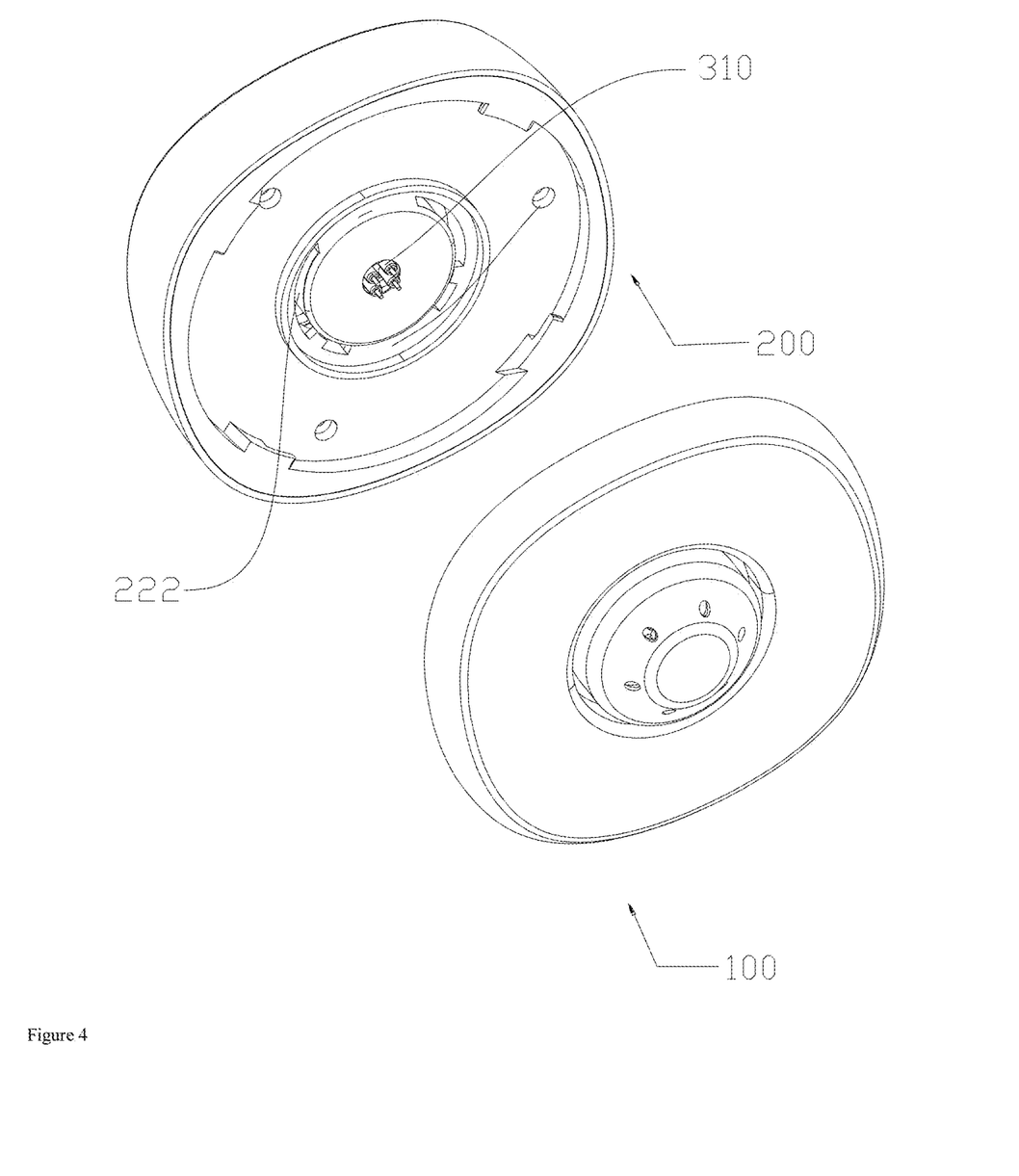
FIG. 4 is a schematic view of the overall structure of the smoking device in a second state from a second angle, according to the first embodiment of the present disclosure.
Figure 5:
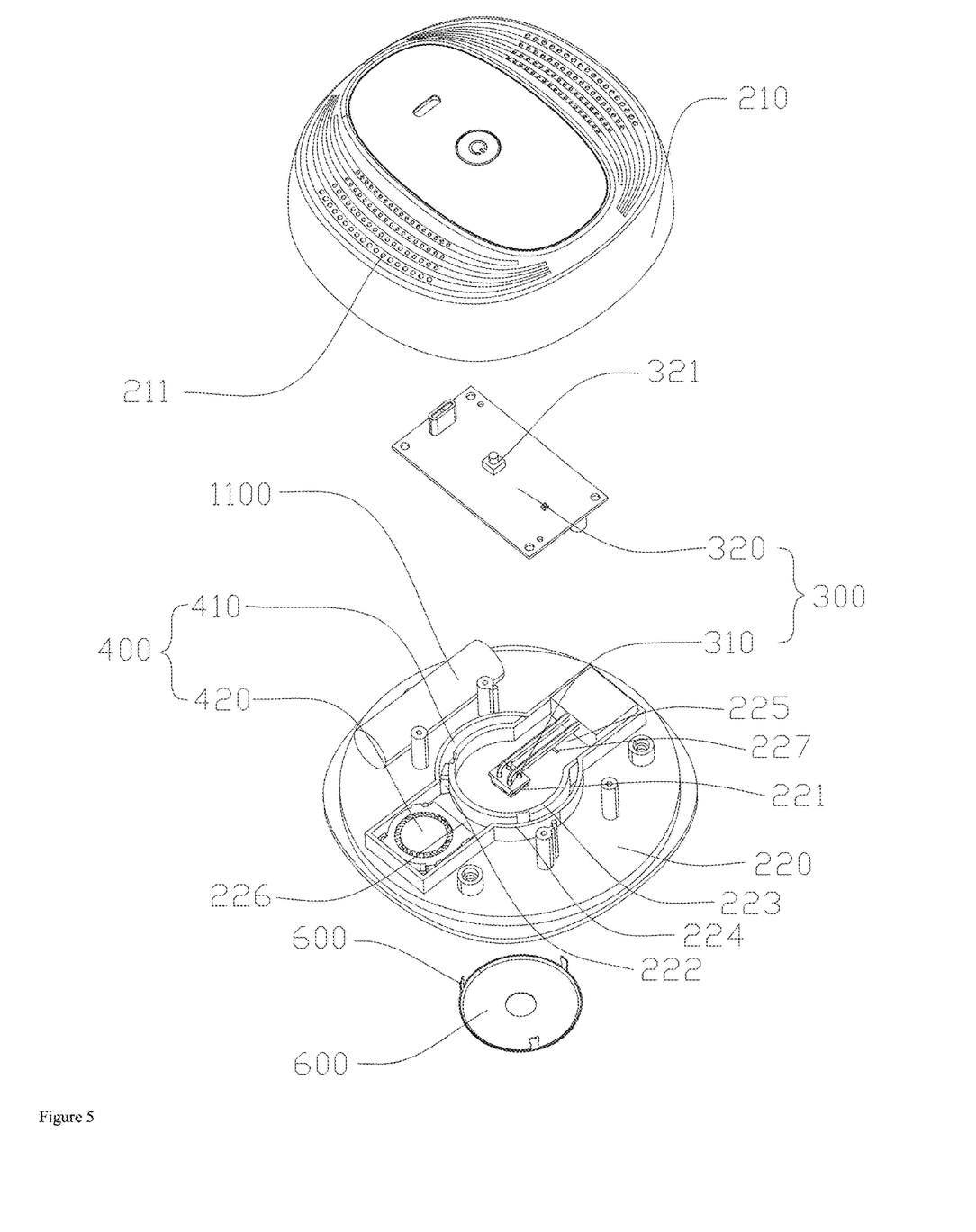
FIG. 5 is an exploded schematic view of a first section of the smoking device, according to the first embodiment of the present disclosure.
Figure 6:
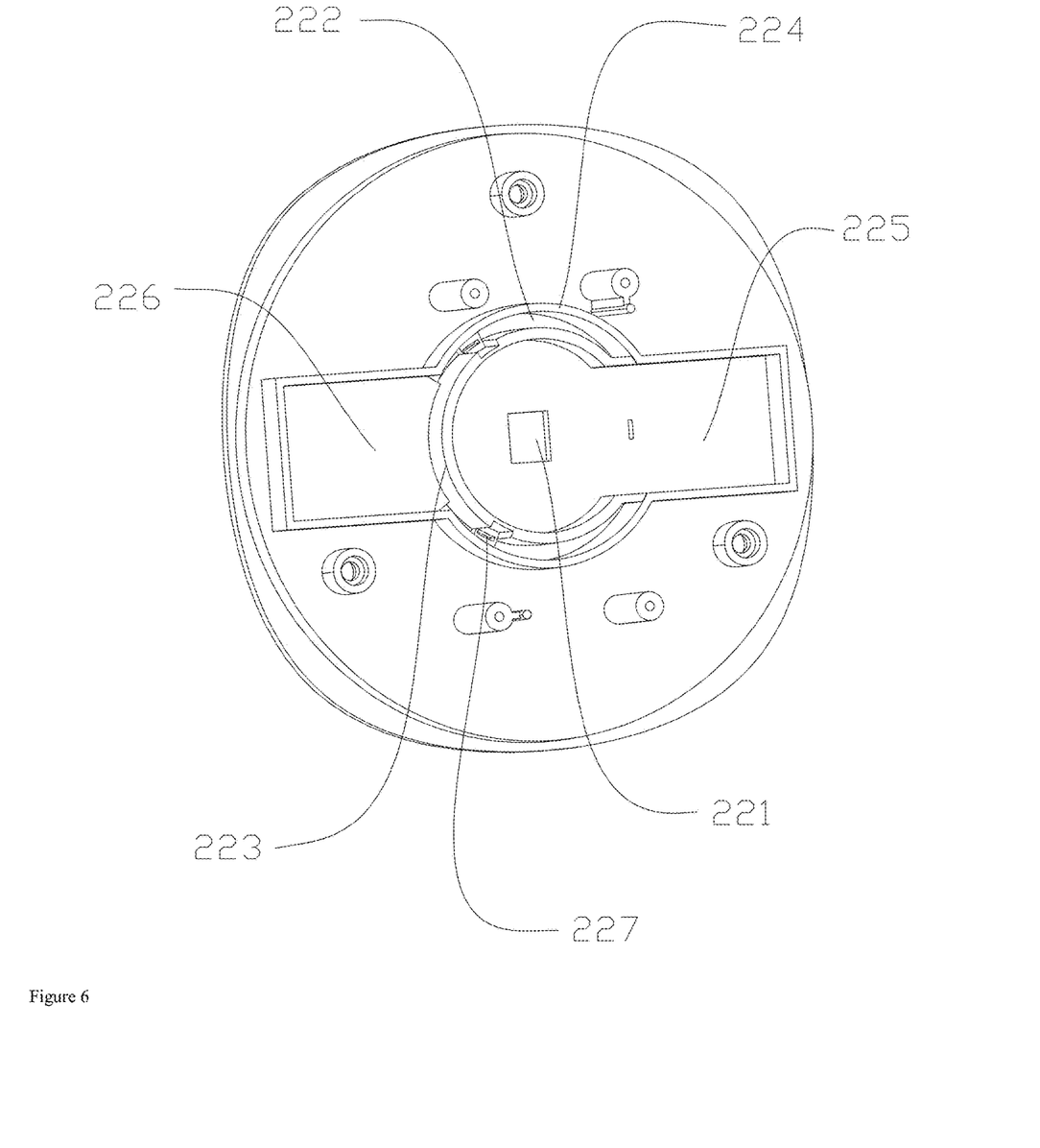
FIG. 6 is a schematic view of the structure of a lower cover of the smoking device, according to the first embodiment of the present disclosure.
Figure 7:
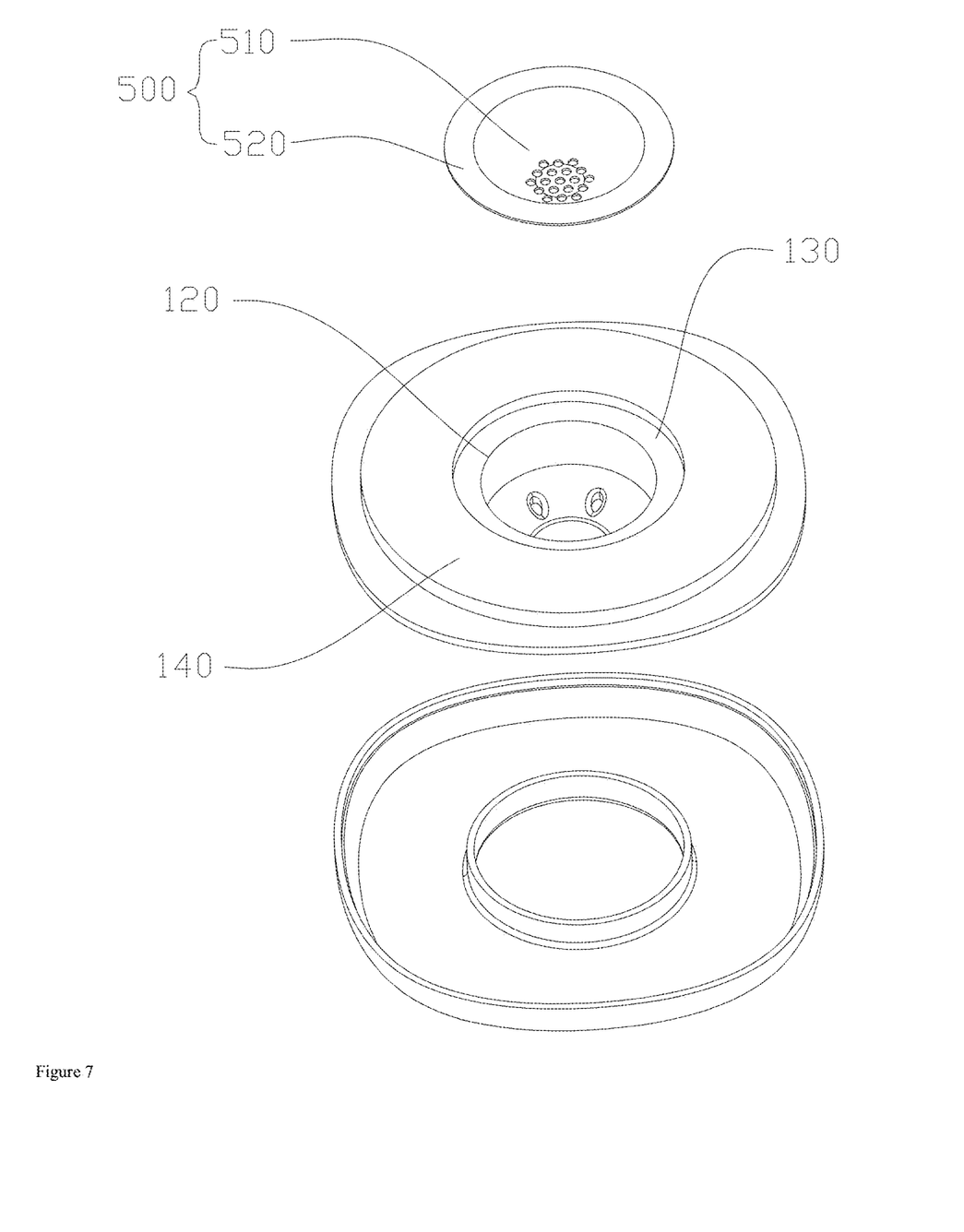
FIG. 7 is an exploded schematic view of a second section of the smoking device, according to the first embodiment of the present disclosure.
Figure 8:
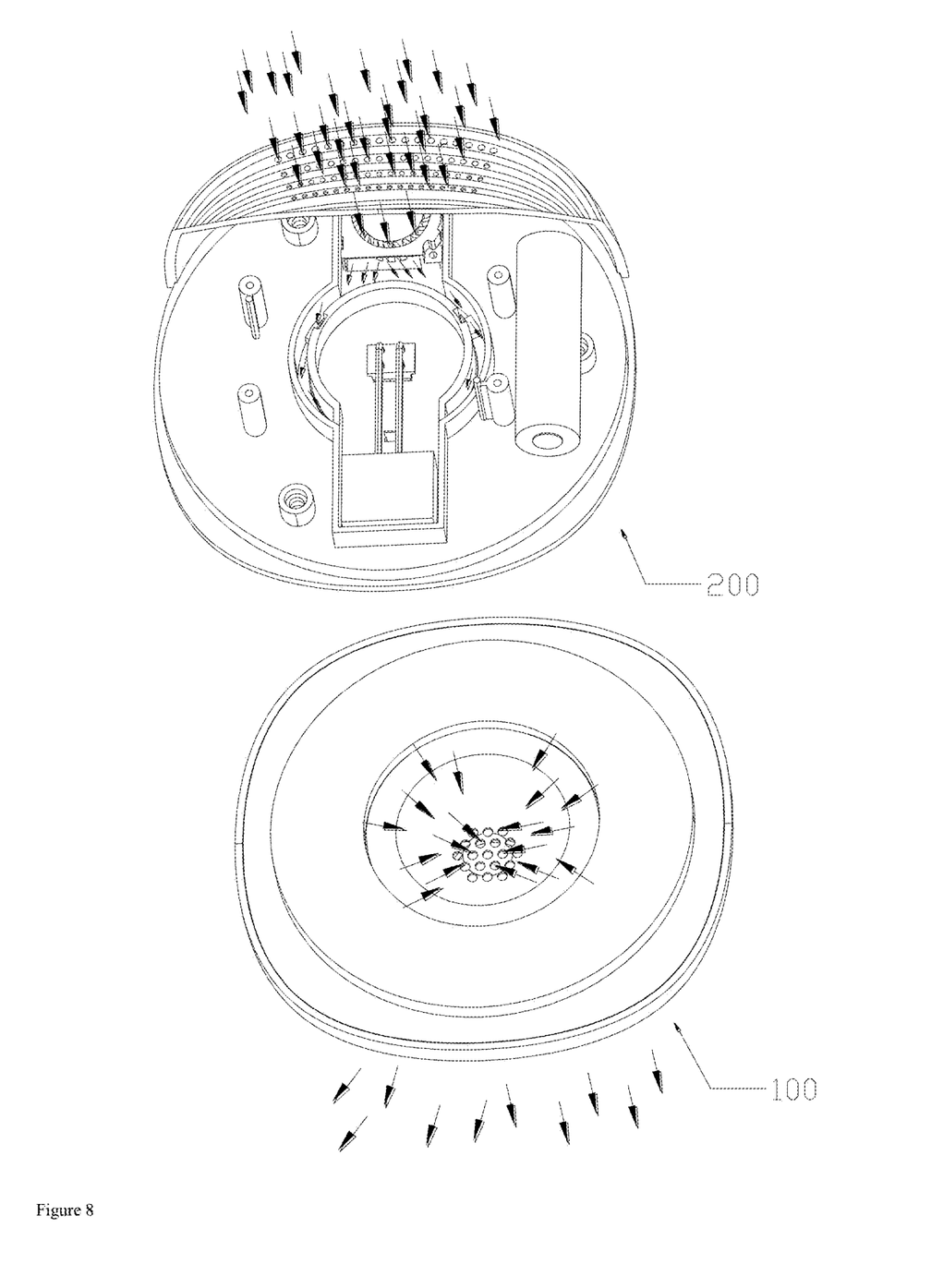
FIG. 8 is a schematic view illustrating the airflow path from a first angle of the smoking device, according to the first embodiment of the present disclosure.
Figure 9:
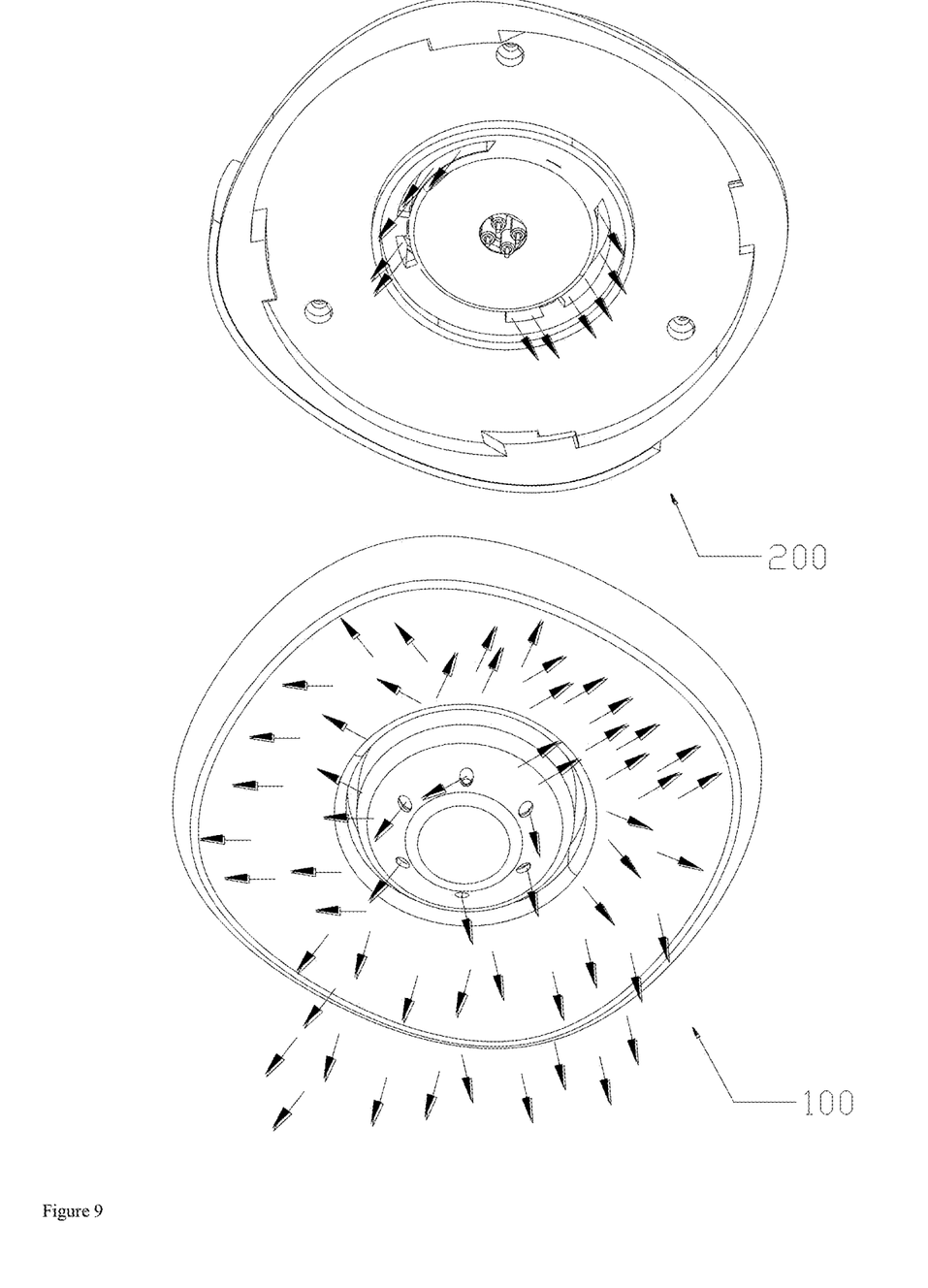
FIG. 9 is a schematic view illustrating the airflow path from a second angle of the smoking device, according to the first embodiment of the present disclosure.
Figure 10:
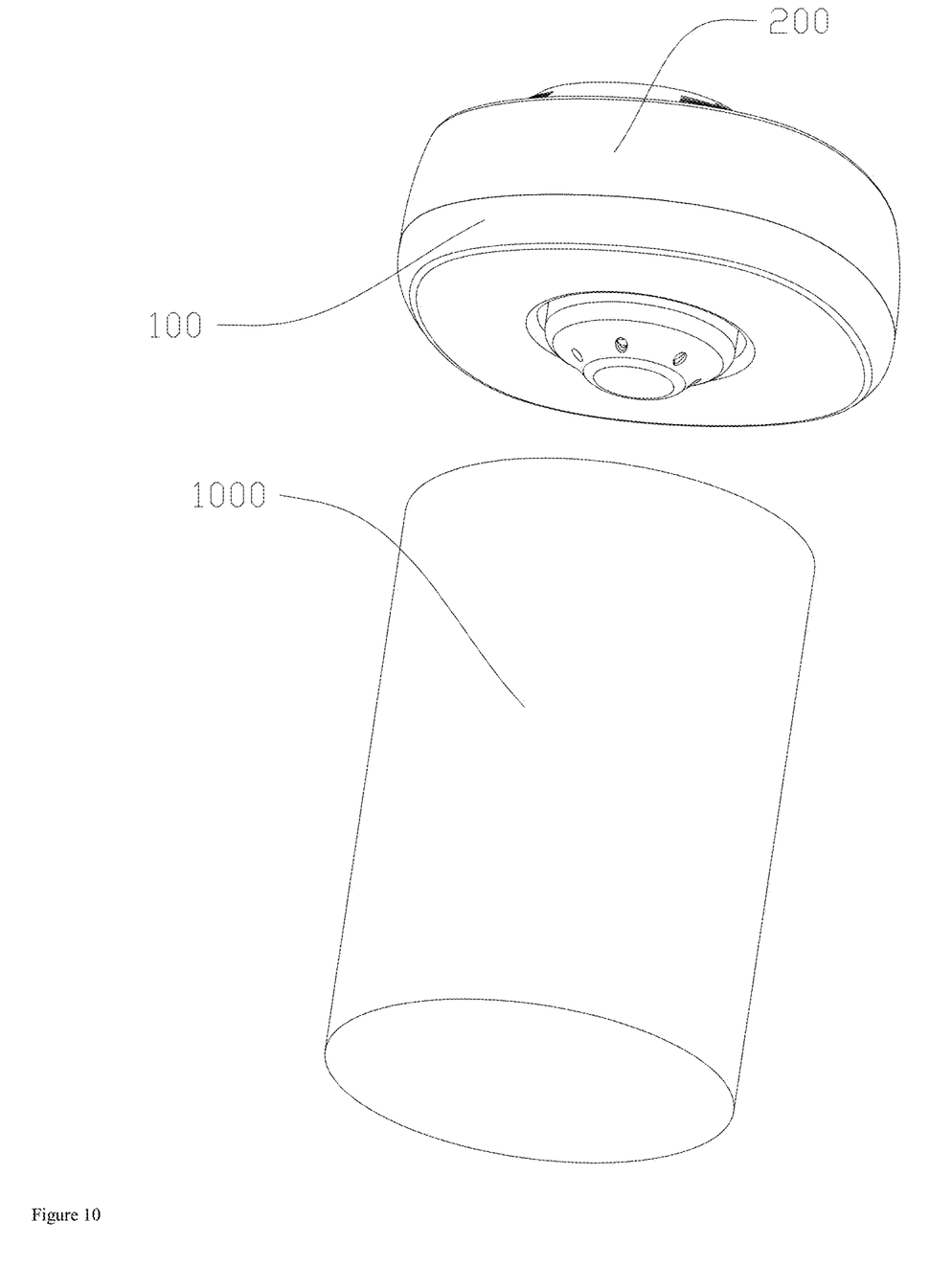
FIG. 10 is a schematic view showing the use of a dedicated smoking cup with the smoking device, according to the first embodiment of the present disclosure.

In this embodiment, a dedicated smoking cup 1000 is further provided. Due to the configuration described above, the dedicated smoking cup 1000 is specifically designed to be compatible with the base 100. Accordingly, the smoking cup 1000 may be customized based on specific application requirements, thereby achieving enhanced smoking performance. It should be noted, however, that use of the dedicated smoking cup 1000 is not mandatory. Any cup having a level rim and an opening area smaller than the bottom surface of the base 100 may be used in conjunction with the smoking device of the present invention.

In this embodiment, the upper cover 210 is provided with an air inlet hole 211. During the combustion of smoker fuels, air is consumed and hot airflow is generated, resulting in changes in pressure within the combustion chamber 110. The air inlet hole 211 serves to balance the internal and external air pressure, thereby preventing reverse smoke flow due to negative pressure or dislodgement of the cover due to positive pressure, ensuring the safe and stable operation of the device. The air inlet hole 211 forms an "entry point" for airflow within an otherwise sealed structure. In conjunction with the smoke guide hole 113 (which serves as the outlet of the smoke zone 112), it defines a unidirectional airflow pathway that drives smoke downward to come into contact with the beverage or food being smoked, imparting it with a smoked flavor.

In this embodiment, the device further comprises a built-in power supply 1100 configured to supply power to the electronic ignition kit 300 and the smoke guiding assembly 400. The built-in power supply 1100 is rechargeable. With this configuration, the built-in power supply 1100—which supports repeated charge and discharge cycles—serves as the core energy source enabling the automation of the smoking device's "electronic ignition+smoke control" functions. It provides essential support for functional operation, enhanced portability, safety assurance, improved user experience, and eco-friendly design. Because the built-in power supply 1100 ensures stable power delivery and possesses rechargeable capability, the smoking device of the present invention can operate independently of traditional open flames or external power sources, thereby supporting a broader range of application scenarios.

It is to be understood that the foregoing represents one or more embodiments provided in connection with specific implementations, and the scope of the present invention is not limited thereto. Any variations, equivalents, or modifications that are similar to the disclosed method or structure, or any technical extrapolations or substitutions made based on the conceptual framework of the present invention, shall be considered within the scope of protection afforded by this invention.

The invention claimed is:

1. A smoking device, comprising:
a base provided with a combustion chamber configured to accommodate the combustion of the smoker fuels, and a feed inlet in communication with the combustion chamber, wherein the combustion chamber comprises a smoke outlet in communication therewith;
a cover detachably coupled to the base and configured to cover the feed inlet;
an electronic ignition kit configured to ignite the smoker fuels;
a smoke delivery assembly configured to direct smoke generated by combustion of the smoker fuels through the smoke outlet to smoke the food;
wherein the cover comprises an upper cover and a lower cover, the upper cover and the lower cover jointly defining an accommodating space, wherein the electronic ignition kit and the smoke delivery assembly are disposed within the accommodating space.

2. The smoking device of claim 1, wherein the lower cover is provided with an ignition opening and an airflow opening, the ignition opening being configured to allow part of the electronic ignition kit to pass through, and the airflow opening being configured to allow airflow for guiding smoke flow to pass through.

3. The smoking device of claim 2, wherein the lower cover further comprises an isolation baffle, the ignition opening is disposed on one side of the isolation baffle, and the airflow opening is disposed on the opposite side of the isolation baffle, such that airflow guiding the smoke enters the combustion chamber through the airflow opening.

4. The smoking device of claim 3, wherein the lower cover further comprises a mounting enclosure, the isolation baffle is disposed within the mounting enclosure, and a first mounting area and a second mounting area are defined within the mounting enclosure, the isolation baffle separating the first mounting zone from the second mounting zone, the first mounting zone being configured to mount the electronic ignition kit, and the second mounting zone being configured to mount the smoke delivery assembly.

5. The smoking device of claim 2, wherein the electronic ignition kit includes an ignition head, and the ignition opening is configured to allow the ignition head to pass through, wherein when the cover is connected to the base, the ignition opening is positioned opposite to an intermediate position of the feed inlet.

6. The smoking device of claim 5, wherein the electronic ignition kit further comprises a control circuit board electrically connected to the ignition head, the control circuit board being provided with an ignition switch configured to control the ignition head to generate an electric spark.

7. The smoking device of claim 6, wherein the smoke delivery assembly comprises an air-guiding channel, the air-guiding channel being jointly defined by a portion of the isolation baffle and a portion of the mounting enclosure, the airflow opening being located at the bottom of and in communication with the air-guiding channel.

8. The smoking device of claim 7, wherein the smoke delivery assembly further comprises a smoke-guiding fan configured to generate airflow to guide the smoke, the smoke-guiding fan being a turbine fan.

9. The smoking device of claim 1, further comprising a filter screen, the filter screen being detachably connected to the base and provided with an inner filter matching the combustion chamber, the inner filter being inserted into the combustion chamber through the feed inlet; when the cover is closed, the filter screen is positioned between the cover and the base, and the inner filter is inserted into the combustion chamber.

10. The smoking device of claim 9, wherein the combustion chamber comprises a combustion zone, a smoke zone, and the smoke-guiding hole, the combustion zone and the smoke zone being separated by the inner filter, the combustion zone being located above the inner filter, and the smoke zone being located below the inner filter; the smoke-guiding hole is disposed on a chamber wall defining the combustion chamber, and is in communication with the smoke zone.

11. The smoking device of claim 10, wherein the filter screen includes a filter frame ring, the upper portion of the base is provided with a filter groove and a sealing platform surrounding the filter groove, the size of the filter groove corresponds to that of the filter frame ring, and the sealing platform is configured to form a closed connection with the cover to seal the upper portion of the base.

12. The smoking device of claim 10, wherein the inner filter is configured to achieve a clearance fit with the combustion chamber when inserted through the feed inlet.

13. The smoking device of claim 2, further comprising a heat insulation element, the heat insulation element being detachably connected to the lower cover.

14. The smoking device of claim 13, wherein the heat insulation element comprises a snap-fit plate, the lower cover comprises a snap-fit hole, and the snap-fit plate is detachably connected to the snap-fit hole to removably attach the heat insulation element to the lower cover.

15. The smoking device of claim 1, further comprising a dedicated smoking cup.

16. The smoking device of claim 1, wherein the upper cover is provided with an air inlet hole.

17. The smoking device of claim 1, further comprising a built-in power supply, the built-in power supply being configured to provide power to the electronic ignition kit and the smoke delivery assembly, the built-in power supply being a rechargeable power source.

* * * * *